United States Patent [19]

Rabinkin

[11] Patent Number: 4,871,622
[45] Date of Patent: Oct. 3, 1989

[54] FLEXIBLE MULTILAYERED BRAZING MATERIALS

[75] Inventor: Anatol Rabinkin, Morris Plains, N.J.

[73] Assignee: Allied Signal Inc., Morris Township, Morris County, N.J.

[21] Appl. No.: 181,890

[22] Filed: Apr. 15, 1988

[51] Int. Cl.$^4$ .................. B23K 35/16; B23K 35/18
[52] U.S. Cl. .................. 428/576; 428/607; 228/56.3
[58] Field of Search ............ 428/607, 592, 674, 680, 428/636-638, 576; 148/403; 228/56.3

[56] References Cited

U.S. PATENT DOCUMENTS

| | | | |
|---|---|---|---|
| 2,445,858 | 7/1948 | Mitchell et al. | 228/56.3 |
| 2,503,564 | 4/1950 | Reeve | 228/56.3 |
| 3,181,935 | 5/1965 | Coad | 428/607 |
| 3,239,125 | 3/1966 | Sherlock | 228/56.3 |
| 3,458,923 | 8/1969 | Hoffman | 228/56.3 |
| 3,652,237 | 3/1972 | Mizuhara | 428/941 |
| 4,142,571 | 3/1979 | Nurasimhan | 164/439 |
| 4,405,391 | 9/1983 | Decristofaro | 148/403 |
| 4,448,853 | 5/1984 | Fischer et al. | 428/607 |
| 4,529,457 | 7/1985 | Kushnick | 148/403 |

OTHER PUBLICATIONS

Semalloy Brazing Alloys, Semi-Alloys, Technical Bulletin No. BA-65, Jul. 1968.

Primary Examiner—John J. Zimmerman
Attorney, Agent, or Firm—Gus T. Hampilos

[57] ABSTRACT

A flexible multilayered brazing material is disclosed comprising at least one layer of ductile brazing foil defining a core body having two major surfaces and at least one minor surface, and at least one layer of ductile brazing foil substantially covering said two major surfaces and at least one minor surface. In particular, the layer(s) and the covering foil are each at least about 50% amorphous, with the covering foil being, most preferably, helically wrapped around the layers. The multilayered brazing materials enable brazing of large gaps and wide gaps formed by juxtaposed parts to be brazed. Processes for producing the flexible multilayered brazing material are also disclosed.

9 Claims, 6 Drawing Sheets

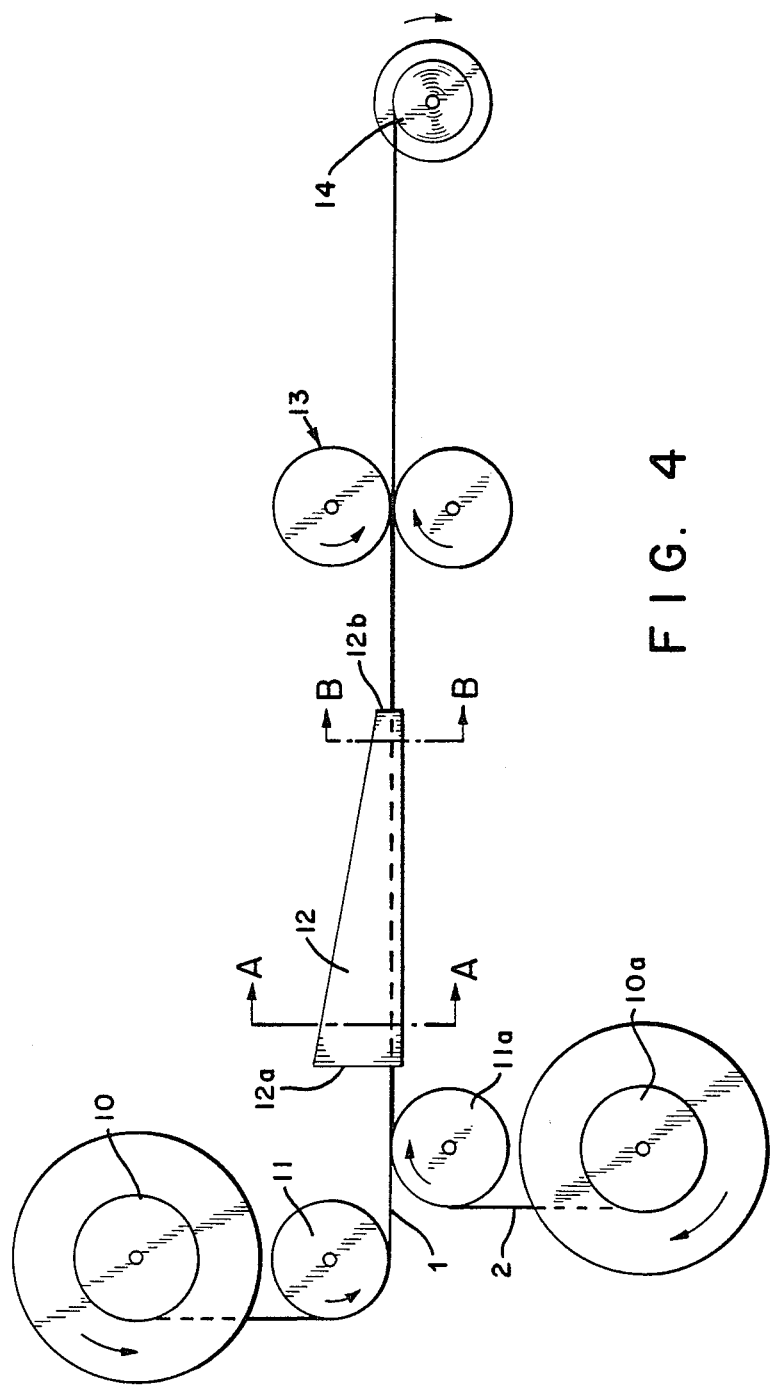

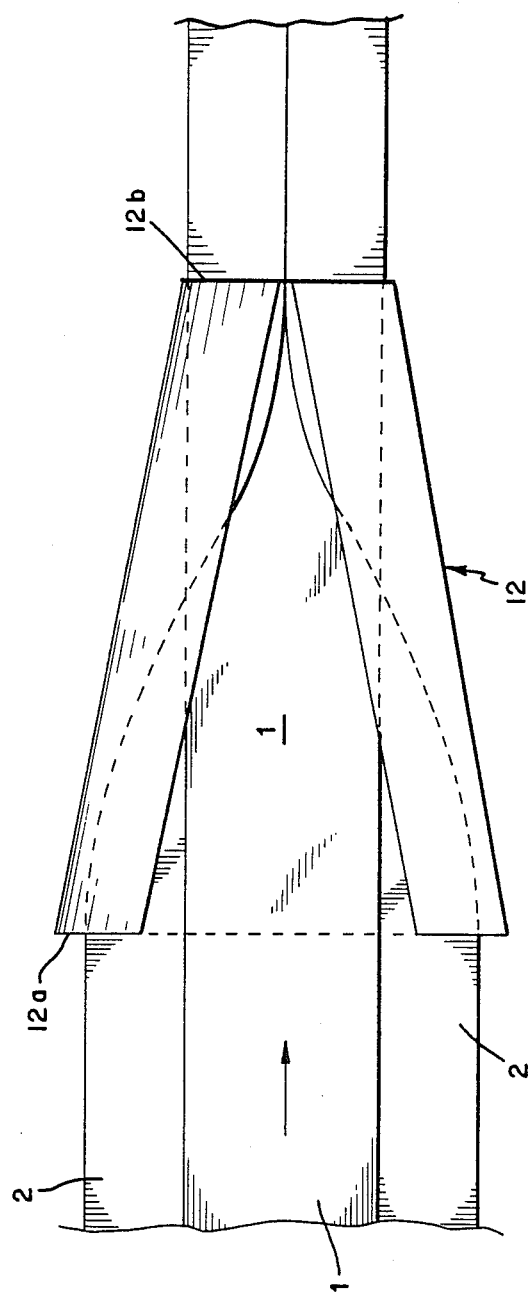

FLEXIBLE MULTILAYERED BRAZING MATERIALS

BACKGROUND OF THE INVENTION

The present invention relates to brazing of metal parts and, in particular, to brazing filler metals useful for brazing gaps of thickness greater than about 100 μm and width of several inches or more.

Brazing is a process for joining metal parts, often of dissimilar composition, to each other. Typically, a filler metal that has a melting point lower than that of the metal parts to be joined is interposed between the parts to form an assembly. The assembly is then heated to a temperature sufficient to melt the filler metal. Upon cooling, a strong, preferably corrosion resistant, joint is formed.

Conventional brazing filler materials exist in a wide variety of forms which are characteristic of metallic materials, namely: powders, pastes formed from powders, foils, strips and rods. Among these forms, strips and foils of brazing filler metals offer the most promise in the formation of uniformly brazed joints because of the relative ease of placement of the brazing filler metals into the assembly to be brazed.

Recently, a variety of alloys have been developed which can be cast into homogeneous, ductile, thin brazing foils by, for example, the casting process disclosed in U.S. Pat. No. 4,142,571. This casting process, known as planar flow casting, involves solidification of molten metal into a thin foil by casting onto a rapidly moving quenching surface. Alloys suitable for casting into such foils are disclosed, for example, in U.S. Pat. No. 4,405,391. However, homogeneous ductile brazing foil materials produced thusfar do not exceed about 90 μm ($\approx$0.035 in) in thickness.

In many applications, however, the brazing gap thickness is greater than about 100 μm and/or wider than about 250 mm ($\approx$10 in.) Accordingly, it has been necessary to individually place a plurality of the foils into the joint to be brazed, either in a stacked and/or side-by-side configuration. Unfortunately, problems are created in maintaining the layers in proper alignment with each other and, as a result, the use of a plurality of individual layers has not gained commercial acceptance.

It is known to consolidate a number of layers of at least 50% amorphous ribbon by the process disclosed in U.S. Pat. No. 4,529,457. Also, attempts have been made to use adhesives to consolidate multiple layers of these materials. In the former instance, however, copper-phosphorus and nickel-boron-silicon-base brazing foils become brittle on consolidation and, therefore, would have extremely limited use in brazing joints of complex shape. In the latter instance, use of adhesives produces the unacceptable result of unwanted residue or porosity in the brazed joint. As a result, non-uniform and, in many instances, unacceptably weak joints are produced.

There remains a need in the art for thick and/or exceptionally wide, flexible frazing foils which can accommodate brazing of large parts such as tail pipes of aircraft turbine engines.

SUMMARY OF THE INVENTION

In accordance with the invention, there is provided a flexible multilayered brazing material suitable for use in brazing joints having a gap thickness greater than about 100 μm and/or a width in excess of the width of a single foil.

The flexible multilayered brazing material comprises, in combination, at least one layer of ductile brazing foil defining a core body having two major surfaces and at least one minor surface, and at least one layer of ductile brazing foil substantially covering said two major surfaces and at least one minor surface of said core body. More particularly, the core body and cover layer are each composed of metastable material which is at least about 50% amorphous.

BRIEF DESCRIPTION OF THE DRAWINGS

FIG. 4 is a side view of apparatus useful for producing multilayered product of the type illustrated in FIG. 1.

FIG. 6 is a top view of the forming die illustrated in FIG. 4 showing the folding regiment of the cover layer as it travels through the forming die.

DETAILED DESCRIPTION OF THE INVENTION

Figure 1:
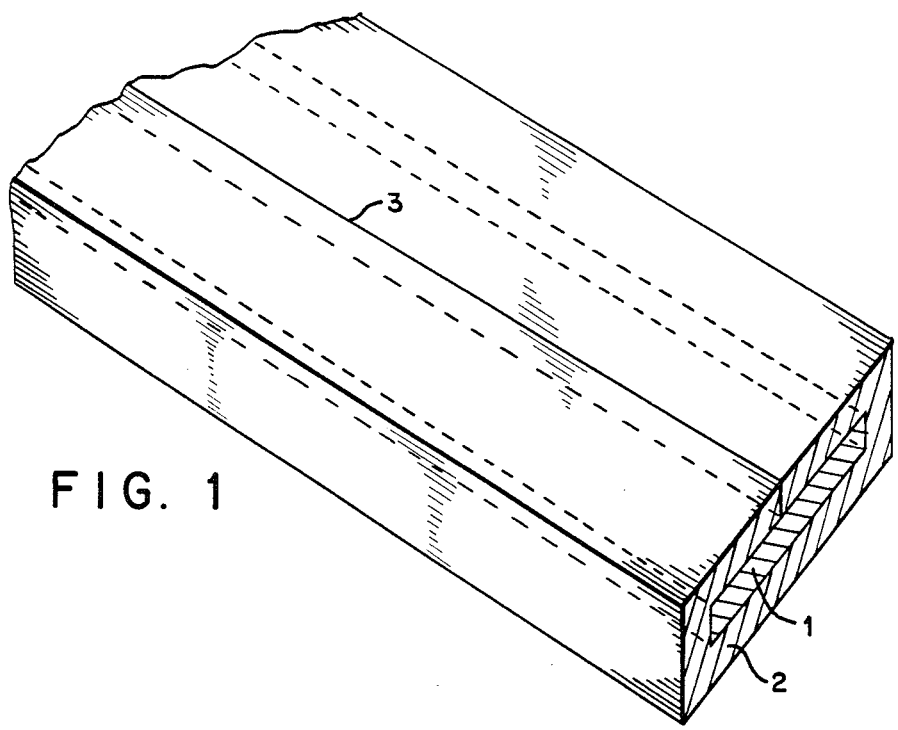
FIG. 1 illustrates the simplest form of a product of the present invention, with the cover layer having been folded over the core body.
Figure 2:
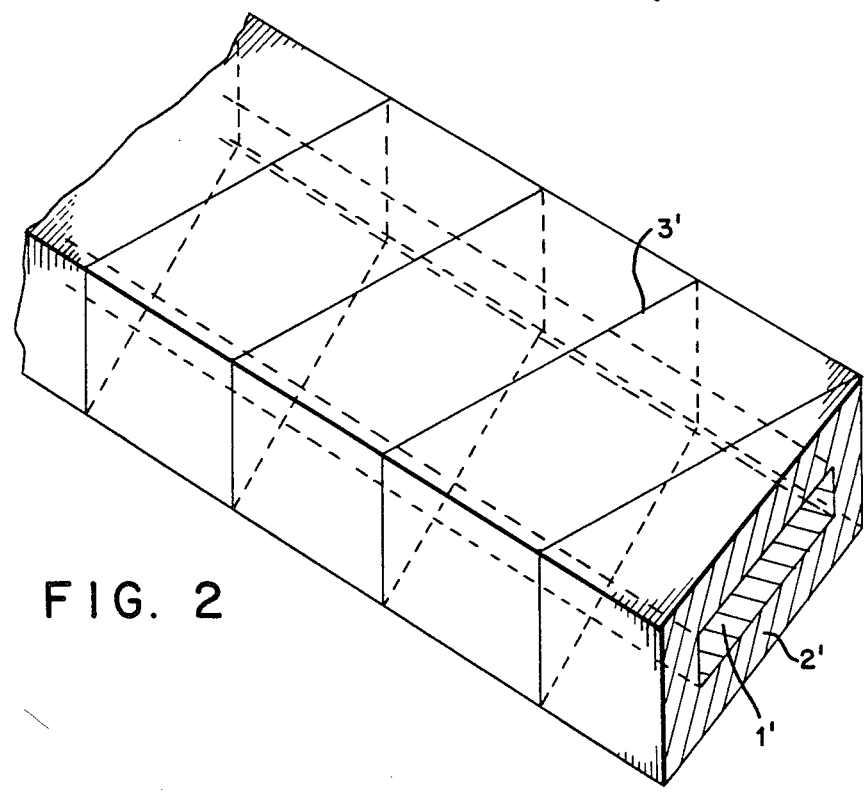
FIG. 2 illustrates the simplest form of the most preferred product of the present invention, with the cover layer helically wrapped around the core body.

The present invention is illustrated, in its simplest form, in FIGS. 1 and 2. FIG. 1 shows a multilayered brazing strip in accordance with the present invention consisting of a single layer of brazing material defining a core body 1 encased in a covering layer 2. In this embodiment, the cover layer 2 is formed by folding a single strip of brazing foil having a width equal to about $2l+2d$, where "l" is the width of the core body 1 and "d" is the thickness of core body 1, about the core body 1 such that the edges of the cover layer 2 contact to form a seam 3 along one surface of the multilayered product. FIG. 2 shows an alternate, more preferred embodiment of the present invention wherein the core layer 1' is helically wrapped along its length with a cover layer 2'. In the embodiment of FIG. 2, the width of the cover layer need not be related to the width of the core body because the angle of wrapping will control the formation of a continuous cover and the same 3'. In either embodiment, it is very desirable to avoid any significant overlap of edges of the cover layer in order to maintain substantial uniformity of the thickness of the final product.

In the present invention, the thickness of the multilayered product can be controlled by providing more than one layer to define the core body or, similarly, more than one cover layer. However, regarding in the latter-, one cover layer is most preferred.

Figure 3:
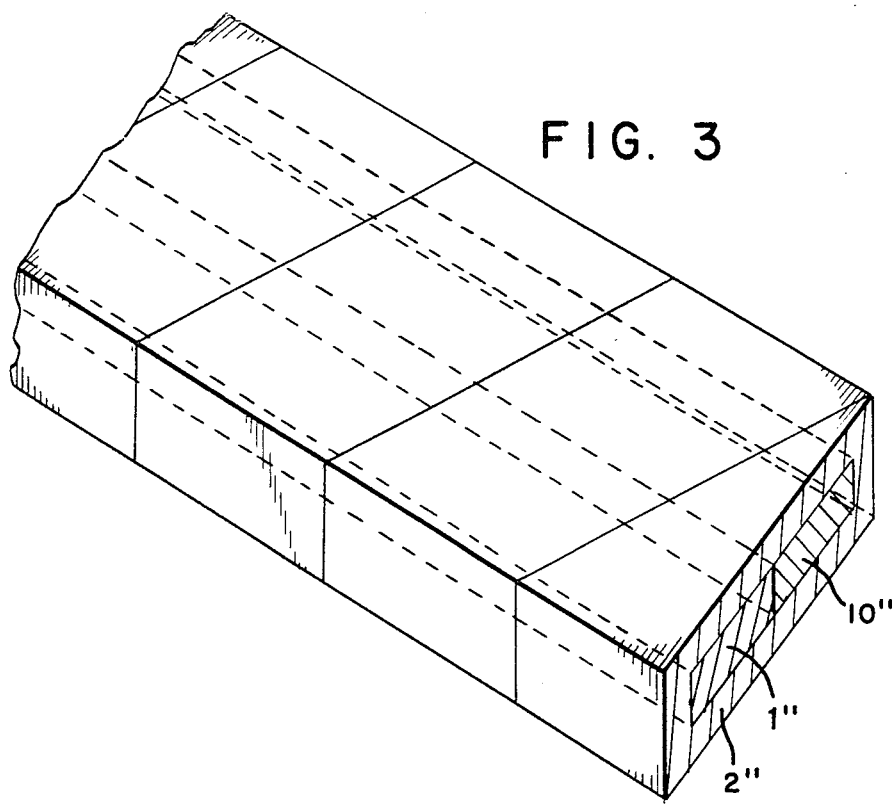
FIG. 3 illustrates the production of exceptionally wide strip by arranging a plurality of layers in side-by-side relationship to define a core body which is then wrapped in the cover layer.

Another embodiment of the present invention is illustrated in FIG. 3. In this embodiment, a plurality of layers 1", 10" are arranged in side-by-side relation to define the core body and thereafter wrapped in a cover layer 2" to produce wide, thick strip. With this embodiment, the width of the strip is, in a practical sense, limited only by the capabilities of the equipment available to properly wrap the core layers.

Although the present invention is conceptionally quite simple, it offers a number of advantages over prior art products. First, alignment problems associated with individually stacked multiple layers in a gap are overcome. Second, elimination of problems associated with using adhesives to bond multiple layers together to form a preformed multilayered product is avoided. Third, brazing is uniform, i.e., non-uniformity in brazement thickness as ordinarily occurs with pastes, powders and rod feed are eliminated. Fourth, thick brazing material formed of at least 50% amorphous ductile foils can be produced which heretofore was unavailable for brazing large components. Fifth, flexible multilayered brazing materials formed from at least 50% amorphous ductile foils can be produced which are particularly useful in the production of uniformly brazed joints having complex shapes.

The brazing foils employed to produce the multilayered products of the present invention must be ductile. That is, the core layer must consist of brazing foil having sufficient flexibility to enable it to be bent to a radius of about 10 times the thickness of the foil without breaking. In addition, the cover layer must be sufficiently flexible such that it can be bent to a radius equal to or slightly less than the thickness of the core body without breaking. Suitable foils useful for the core body material and cover layer are at least about 50% amorphous foils disclosed, for example, in U.S. Pat. Nos. 4,405,391, 4,508,257, 4,448,618 and 4,489,136. As a result of the use of ductile foils in the core body and as the cover layer, the multilayered product will exhibit sufficient flexibility such that it can be bent to a radius equal to about the width of the multilayered product without breaking and without causing substantial displacement of the core body relative to the cover layer upon returns to the unbent condition.

Figure 7:
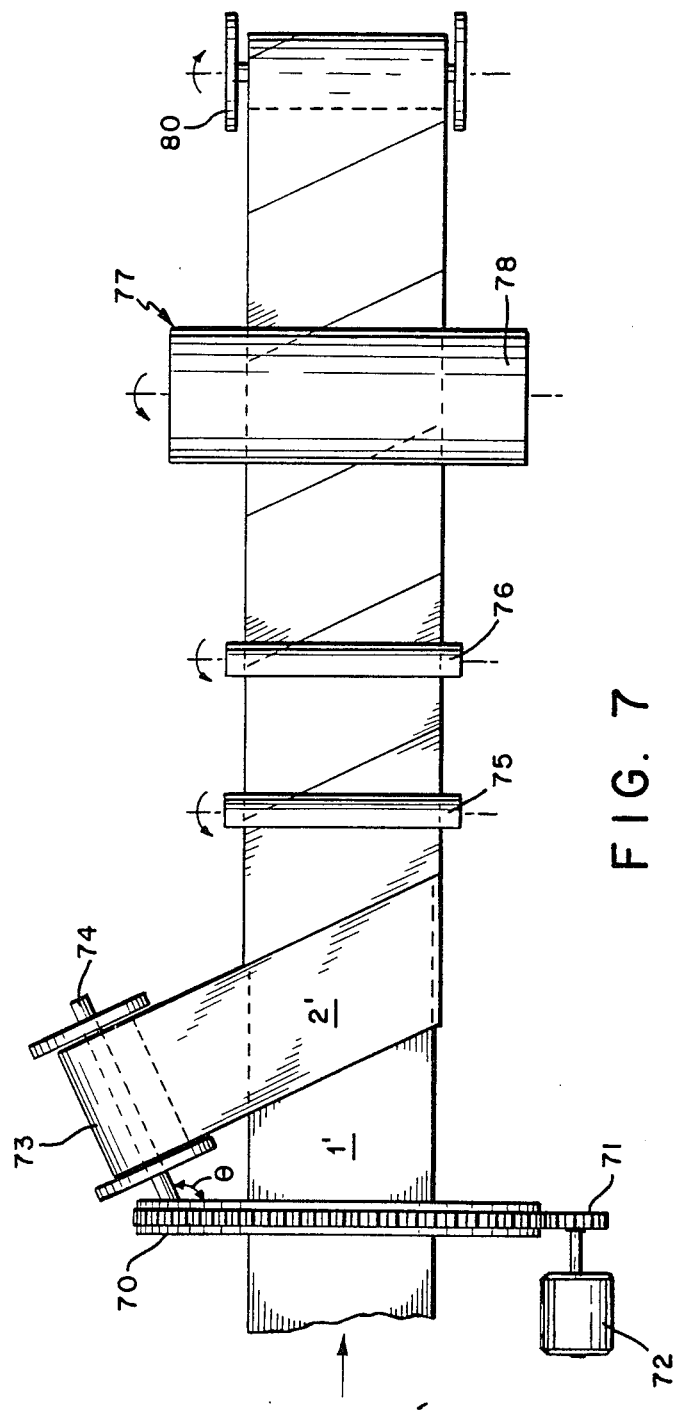
FIG. 7 is a top view of an apparatus useful for producing the product of the type illustrated in FIGS. 2 and 3.
Figure 8:
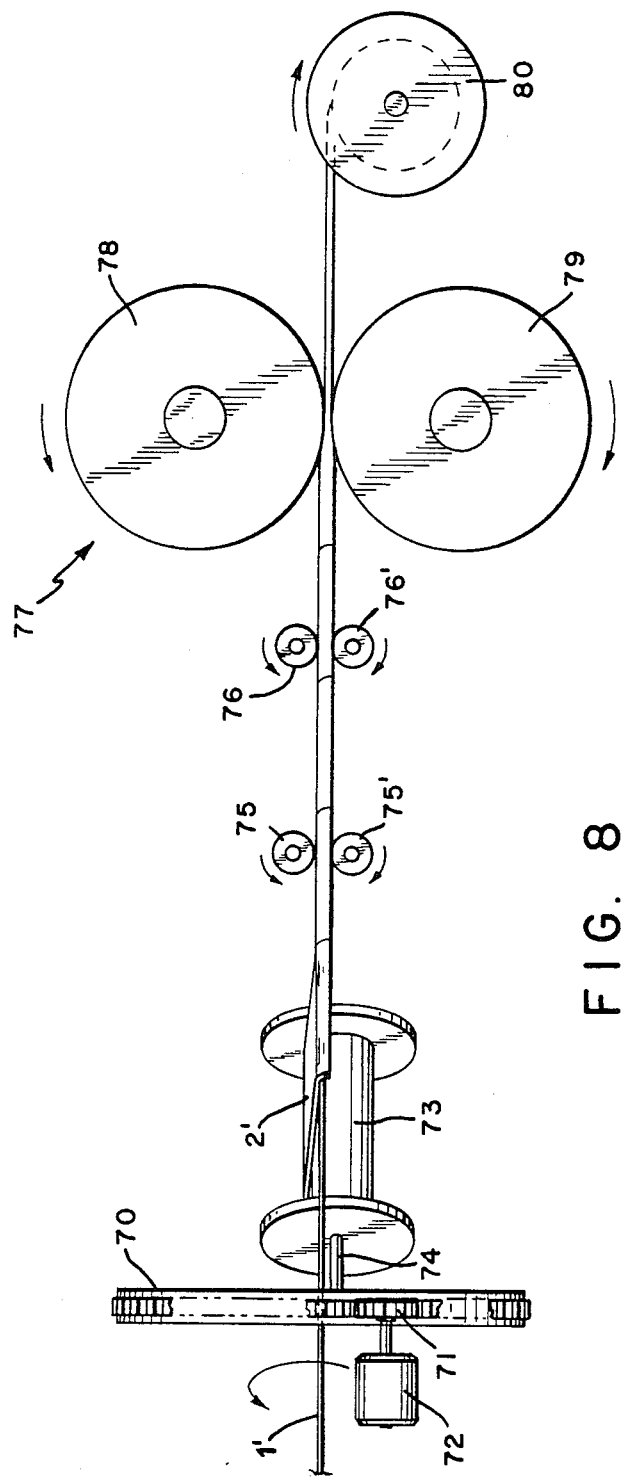
FIG. 8 is a side view of the apparatus illustrated in FIG. 7.

The products of the present invention can be produced by a variety of techniques employing a wide range of equipment. FIGS. 4-6 illustrate a preferred process for continuous manufacturing of multilayered flexible brazing strips from a plurality of ductile, brazing foils. FIGS. 7 and 8 illustrate the most preferred process for continuous manufacturing of multilayered flexible brazing strip from a plurality of ductile brazing foils.

Figure 5A:
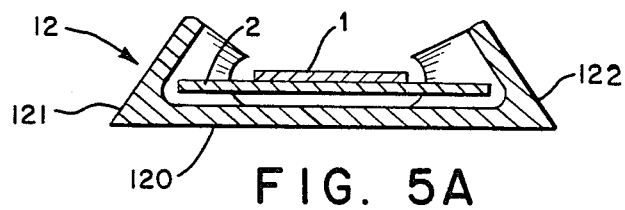
FIG. 5a is a sectional view taken across the line A—A in FIG. 4 showing the general construction of the forming die near the inlet end thereof.
Figure 5B:
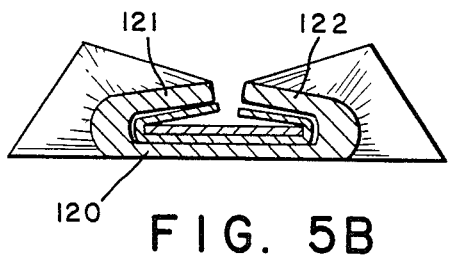
FIG. 5b is a sectional view taken across the line B—B of FIG. 4 illustrating the general construction of the forming die near the outlet end thereof.

According to the process illustrated in FIG. 4, a first ductile brazing foil 1 is continuously dispensed from a first guide roll 10 past a first grade roll 11 into a forming die 12. Simultaneously, a second ductile brazing foil 2 is continuously dispensed from a second feed roll 10a past a second guide roll 11a into forming die 12. As described heretofore, the second foil has a width equal to about $2l+2d$. In the process illustrated in FIG. 4, the second foil is fed beneath the first foil to produce a multilayered preform as illustrated in FIG. 5a. Forming die 12, illustrated in detail in FIGS. 5a, 5b and 6, consists of a generally flat bottom portion 120 and angular side walls 121, 122. The angular side walls 121, 122 gradually change shape from the input end 12a of the forming die 12 to the output end 12b of the forming die 12, thereby causing the second foil to be deformed in such a manner as to gradually fold over the major and minor side surface(s) of the first strip. This gradual folding process is more clearly illustrated by reference to FIG. 6, referring to lines 21, 22 which represent the edges of second foil 2. Referring again to FIG. 4, the multilayered preform is then subjected to cold rolling, at cold rolling mill 13, sufficient to cause permanent deformation of the second strip (cover layer) necessary to produce the final product illustrated in FIG. 1. Ordinarily, the degree of permanent (plastic) deformation or cold rolling is about 1-2%, and should not exceed about 3%. The cold rolled, flexible, multilayered brazing strip is then wound onto a take up roll 13.

It should be readily apparent that the above described process includes only the basic steps necessary to produce products of the present invention of the type illustrated in FIG. 1. Products of the type wherein the core body consists of multiple stacked layers or multiple layers in side-by-side relationship are readily producible by using the above described process, modified to provide additional feed rolls or feed rolls which supply multiple strips. It should also be readily apparent that the forming step can be accomplished by any of a wide variety of equipment other than the above described forming die such as, for example, rolling equipment arranged in the direction of travel of the strips which effects the folding regimen illustrated schematically in FIG. 6. Moreover, it should be apparent that additional apparatus features such as guiding and aligning rolls and drive mechanisms have been omitted from the illustration because they are not necessary for a complete understanding of the present invention and because it understood by those skilled in the art to include the same.

The most preferred process for production of products of the present invention is illustrated by the apparatus shown in FIGS. 7 and 8. As is readily apparent, the embodiment illustrated therein is employed for the production of products of the type described heretofore with reference to FIGS. 2 and 3.

According to FIG. 7, the core body 1' is fed through the open center of closed loop 70 driven, for example, by a drive gear 71 attached to a motor 72. Associated with the loop 70 is a feed roll 73 mounted on a roll holder 74 arranged at an angle relative to the plane of rotation of the loop 70 to effect a helical wrapping of the core body 1' with the cover layer 2'.

The helically wrapped preform then passes through guide rolls 75 and 76 (bottom rolls 75' and 76' illustrated in FIG. 8) to a cold rolling mill 77 (employing cold rolling rolls 78 and 79 as shown in FIG. 8) plastically deform the cover layer to produce the final form of the multilayered brazing strip illustrated in FIG. 2. From the cold rolling mill, the flexible multilayered product is fed to a take-up roll 80.

As described with respect to FIGS. 4-6, the apparatus illustrated in FIGS. 7 and 8 has been simplified so as to convey the basic features necessary to enable one skilled in the art to make and use the invention. It will be readily apparent that basic changes in the product construction can be effected, for example, by changing the angle of offset between the plane of rotation of the loop 70 and the roll holder 74. (As the angle $\theta$ approaches 90°, significant overlap of the cover layer can occur; alternatively, as the angle becomes more obtuse, gaps in the cover layer can be created.) Further, in order to produce products of the type illustrated in FIG. 3, it is readily apparent that multiple strips forming the core body would be fed in side-by-side relation through the apparatus illustrated in FIGS. 7 and 8.

The following examples are presented to illustrate the production of products within the scope of the present invention. They are not intended to limit the scope of the invention defined by the appended claims in any respect.

EXAMPLE 1

A multilayered, flexible brazing material having a width of about 25 mm ($\approx$1 inch), a thickness of about 150 $\mu$m ($\approx$6 mil) and a length of about 15 m ($\approx$45 feet) was produced using an amorphous alloy having nominal composition (in weight percent) $Cr_7Fe_3Si_{4.5}Co_{0.6}B_{3.2}Ni_{bal}$. The multilayered brazing product was produced by continuously drawing two foils, one 50 mm (about 2 inch wide and about 50 $\mu$m (2 mil) thick and one about 25 mm (one inch) wide and about 50 $\mu$m (2 mil) thick simultaneously using a specially designed die followed by cold rolling (schematically illustrated in FIGS. 4-6). During the drawing, the wide foil folds onto the narrow foil, effectively encasing the narrow foil. The multilayered foil was cold rolled at a 60 m/min ($\approx$180'/min) production rate under a pressure of about 25 kPa to produce a rolled strip of about 150 $\mu$m ($\approx$6 mil) thick. Production rate was controlled by regulating the rotation speed of the cold rolling mill and the take-up roll which is positioned after the cold rolling mill (shown in FIG. 4).

EXAMPLE 2

A 160 mm wide and 150 $\mu$m thick flexible multilayered brazing product is produced from amorphous foil having a nominal composition as recited in Example 1. The production technique consists of laying up, in side-by-side fashion, three amorphous foils of about 50 mm in width and about 50 $\mu$m in thickness and thereafter helically wrapping a covering foil of about 50 mm width and about 50 $\mu$m thickness to form a flat helicoid surrounding the three side-by-side foils forming the core body. Afterwards, the wrapped foil is rolled through a two roll cold rolling mill. (As schematically illustrated in FIGS. 7 and 8). As a result, a flat multilayered product of substantially rectangle cross-section is produced.

Having described the invention in full clear concise and exact terminology so as to enable one skilled in the art to make and use the same, the full scope of the invention is defined by the appended claims.

We claim:

1. A cold rolled flexible multilayered brazing material comprising, in combination, at least one layer of ductile brazing foil defining a core body having two major surfaces and at least one minor surface, and at least one layer of ductile brazing foil substantially covering said two major surfaces and at least one minor surface of said core body, wherein said core body is formed of ductile brazing foil which is at least about 50% amorphous and wherein said at least one layer of ductile brazing foil is at least about 50% amorphous and wherein said at least one layer of ductile brazing foil has not been subjected to permanent deformation in excess of 3%.

2. The flexible multilayered brazing material of claim 1 wherein said core body consists of elongated brazing foil having a generally rectangular cross section taken normal to the direction of elongation.

3. The flexible multilayered brazing strip of claim 2 wherein said core body comprises a plurality of elongated brazing foils each having a generally rectangular cross-section taken normal to the direction of elongation, said foils being arranged such that a surface of each foil which includes a major dimension of the rectangular cross section abuts a similar surface of an adjacent foil.

4. The flexible multilayered brazing strip of claim 2 wherein said core body comprises a plurality of ductile brazing foils each having a generally rectangular cross-section taken normal to the directions of elongation, said foil being arranged such that a surface of each elongated strip which includes a minor dimension of the rectangular cross section abuts a similar surface of an adjacent foil.

5. The flexible multilayered brazing material of claim 1 wherein said at least one layer of brazing foil forms a helix around said core body.

6. The flexible multilayered brazing strip of claim 3 wherein the strip has a thickness equal to or greater than about 100 $\mu$m.

7. The flexible multilayered brazing strip of claim 4 wherein the strip has a width greater than about 25 cm.

8. The flexible multilayered brazing material of claim 1 wherein each of said core body and said at least one layer of brazing foil are composed of copper-phosphorus-based alloys.

9. The flexible multilayered brazing material of claim 1 wherein each of said core body and said at least one layer of brazing foil are composed of nickel-boron-silicon-based alloys.

* * * * *